United States Patent
Böhm et al.

(10) Patent No.: US 7,250,476 B1
(45) Date of Patent: Jul. 31, 2007

(54) MULTI-FUNCTIONAL POLYMERS

(75) Inventors: Georg G. A. Böhm, Akron, OH (US); William L. Hergenrother, Akron, OH (US); Christine M. Rademacher, Akron, OH (US)

(73) Assignee: Bridgestone Corporation, Chou-ku, Tokyo (JP)

( * ) Notice: Subject to any disclaimer, the term of this patent is extended or adjusted under 35 U.S.C. 154(b) by 294 days.

(21) Appl. No.: 10/632,344

(22) Filed: Aug. 1, 2003

Related U.S. Application Data

(60) Provisional application No. 60/400,340, filed on Aug. 1, 2002.

(51) Int. Cl.
*C08F 136/04* (2006.01)
*C08F 236/04* (2006.01)

(52) U.S. Cl. .............. 525/331.9; 525/332.9; 525/333.2; 525/333.3; 525/361; 525/366; 525/375; 525/379; 526/335; 526/340

(58) Field of Classification Search ............ 525/331.9, 525/332.9, 333.2, 333.3, 361, 366, 375, 379; 526/335, 340
See application file for complete search history.

(56) References Cited

U.S. PATENT DOCUMENTS

| 5,268,439 A | 12/1993 | Hergenrother et al. ...... 526/340 |
| 5,786,441 A | 7/1998 | Lawson et al. ............. 528/229 |
| 6,046,288 A | 4/2000 | Lawson et al. ............. 526/175 |
| 6,080,835 A | 6/2000 | Lawson et al. ............. 528/396 |
| 6,255,424 B1 * | 7/2001 | Knauss ........................ 526/347 |
| 6,579,949 B1 | 6/2003 | Hergenrother et al. ...... 525/342 |

OTHER PUBLICATIONS

"Hysteresis Contributions in Carbon Black-Filled Rubbers Containing Conventional and Tin End-Modified Polymers" by Ulmer et al., Rubber Chemistry and Technology, vol. 71, pp. 637-667, 1997.

* cited by examiner

*Primary Examiner*—Roberto Rabago
(74) *Attorney, Agent, or Firm*—Meredith E. Hooker; Arthur Reginelli

(57) ABSTRACT

A multi-functional polymer defined by the formula

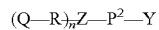

where $(Q-R)_n$ is a functionality cluster, Q is a functional group, R is a multi-valent organic group, $P^2$ is a long-chain polymer, n is an integer from about 2 to about 10, Y is a proton, a weak functional group, or a selective functional group, and Z is a branch point where the functionality clusters join the long-chain polymer.

20 Claims, 2 Drawing Sheets

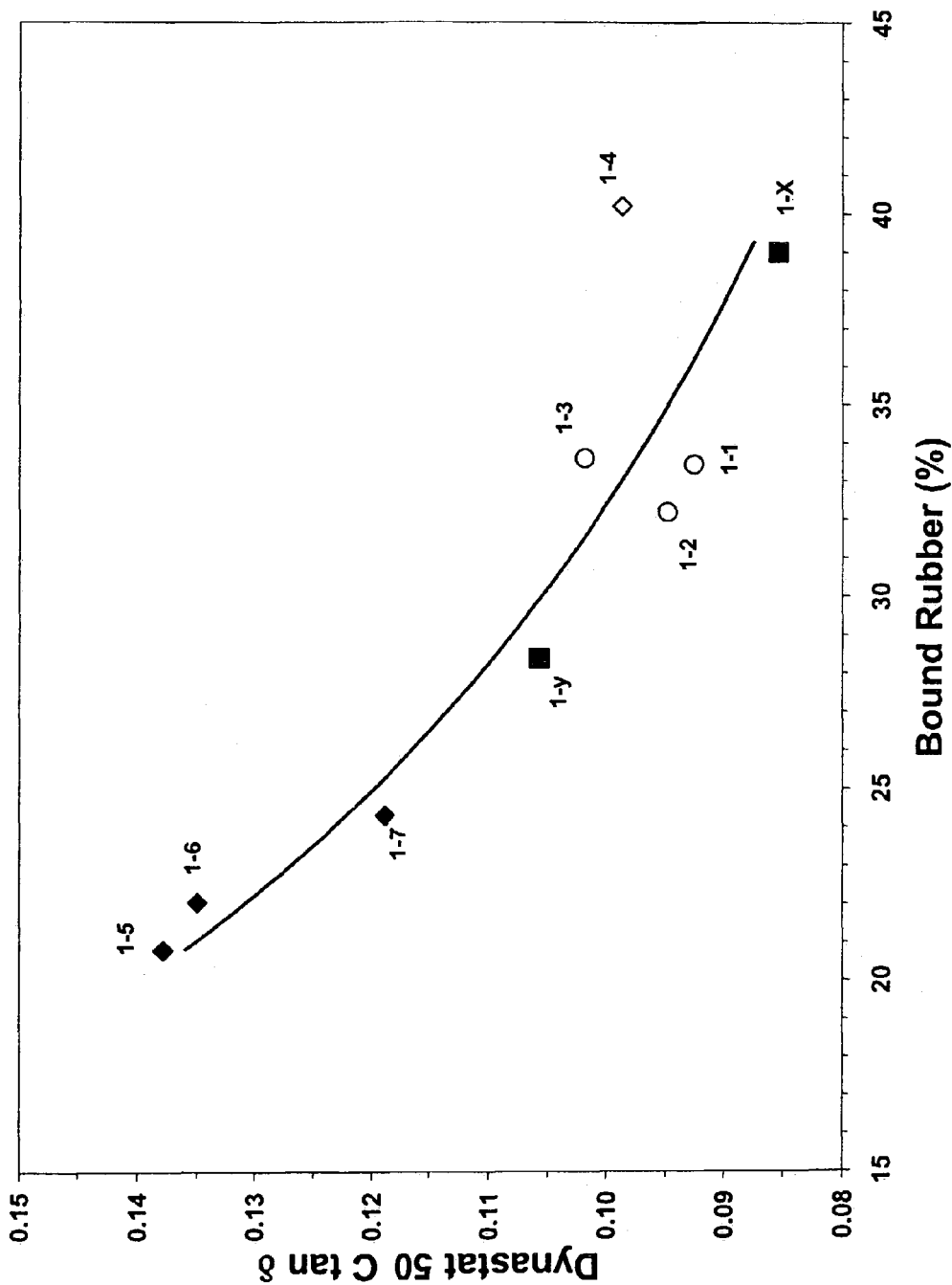

MULTI-FUNCTIONAL POLYMERS

This application gains benefit from U.S. Provisional Patent Application No. 60/400,340, filed on Aug. 1, 2002.

FIELD OF THE INVENTION

This invention relates to multi-functional polymers and processes for making the same.

BACKGROUND OF THE INVENTION

In the art of making tires, it is desirable to employ rubber vulcanizates that demonstrate reduced hysteresis loss, i.e., less loss of mechanical energy to heat. Hysteresis loss is often attributed to polymer free ends within the cross-linked rubber network, as well as the disassociation of filler agglomerates.

Functionalized polymers have been employed to reduce hysteresis loss. The functional group of the functionalized polymer is believed to interact with a filler particle and thereby reduces the number of polymer free ends. Also, the interaction between the functional group and the filler particles reduces filler agglomeration, which thereby reduces hysteretic losses attributable to the disassociation of filler agglomerates.

One particularly useful functional group is tributyltin. Rubbery polymers containing a tributyltin functionality have produced rubber vulcanizates that demonstrate reduced hysteresis loss. These rubbery polymers have been prepared by anionic polymerization techniques whereby tin-lithio initiators, e.g., tributyltin lithium, have been employed as initiators.

Further reduction in hysteresis loss has been observed where the rubber polymers employed in the manufacture of tires contain functionalities at both the head and tail of the polymer. For example, polybutadiene and poly(styrene-co-butadiene) have been prepared by initiating their polymerization with a tin-lithio initiator, e.g., tributyltin lithium, and terminating the polymerization with alkyltin chlorides, which impart a tin functionality at the end of the polymer chain.

While polymers that have functionalities at both their head and tail have demonstrated the ability to provide filler-reinforced vulcanizates with advantageous hysteresis properties, the ability to process these polymers is reduced as compared to non-functional polymers. Namely, the ability to adequately mix filler particles into the rubber compound has proven to be problematic because it requires greater mixing energy and mixing time.

Because polymers that provide filler-reinforced vulcanizates with reduced hysteresis loss are important in the manufacture of tires, there is a need to overcome problems associated with prior art polymers.

SUMMARY

In general the present invention provides a method for decreasing hysteresis loss of rubber vulcanizates without deleteriously impacting the processability of the rubber composition that yields the vulcanizate, the method comprising employing a multi-functional rubbery polymer in the rubber composition, where the multi-functional polymer includes at least two functional groups at one end of the polymer chain and the opposite end of the polymer is devoid of a functional group or includes a weak functional group or functional group that is selectively functional.

The present invention also includes a process for preparing a multi-functional polymer comprising the steps of preparing a multi-functional macroinitiator by reacting a short-chain living polymer with a molar deficiency of a macroinitiator linking agent defined by the formula

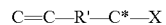

where X is a leaving group, C* is a carbon atom susceptible to nucleophilic attack, and R' is an organic group that will impact the double bond in a manner that will allow the double bond to be anionically polymerized, and polymerizing monomer with the multi-functional macroinitiator.

The present invention further provides a process for preparing a multi-functional polymer comprising the steps of preparing a multi-functional macroterminator by reacting a short-chain functionalized living polymer with a macroterminator linking agent defined by the formula $L_aSiRA$, where Si is a silicon atom, R is an organic group, L is a leaving group, A is a leaving group that is less reactive than L, and a is 2 or more, and terminating a living polymer with the multi-functional macroterminator.

The present invention also includes a process for preparing a multi-functional polymer comprising the steps of polymerizing a hetero block at the head or tail of a rubbery polymer, where the hetero block is prepared by polymerizing functional macromonomer, where the functional macromonomer is a macromolecule that includes a double bond capable of being anionically polymerized, a functional group, and an organic group between the double bond and the functional group where the distance between the double bond and the functional group is less than one entanglement length.

The multi-functional polymers of this invention advantageously achieve greater rubber-filler interaction than unfunctionalized polymers, and in many instances greater than functionalized polymers containing only one functional group, and yet they advantageously demonstrate better processability than polymers that are functionalized at the head and tail. Indeed, it has been surprisingly discovered that increasing the number of functional groups at or near one end of a polymer chain will increase the number of polymer chains that are bound to filler particles without proportionately decreasing processability.

BRIEF DESCRIPTION OF THE DRAWINGS

FIG. 2. is a graphical plot of tan δ as a function of bound rubber for exemplary polymers of this invention and comparative examples.

DETAILED DESCRIPTION OF ILLUSTRATIVE EMBODIMENTS

Figure 1:
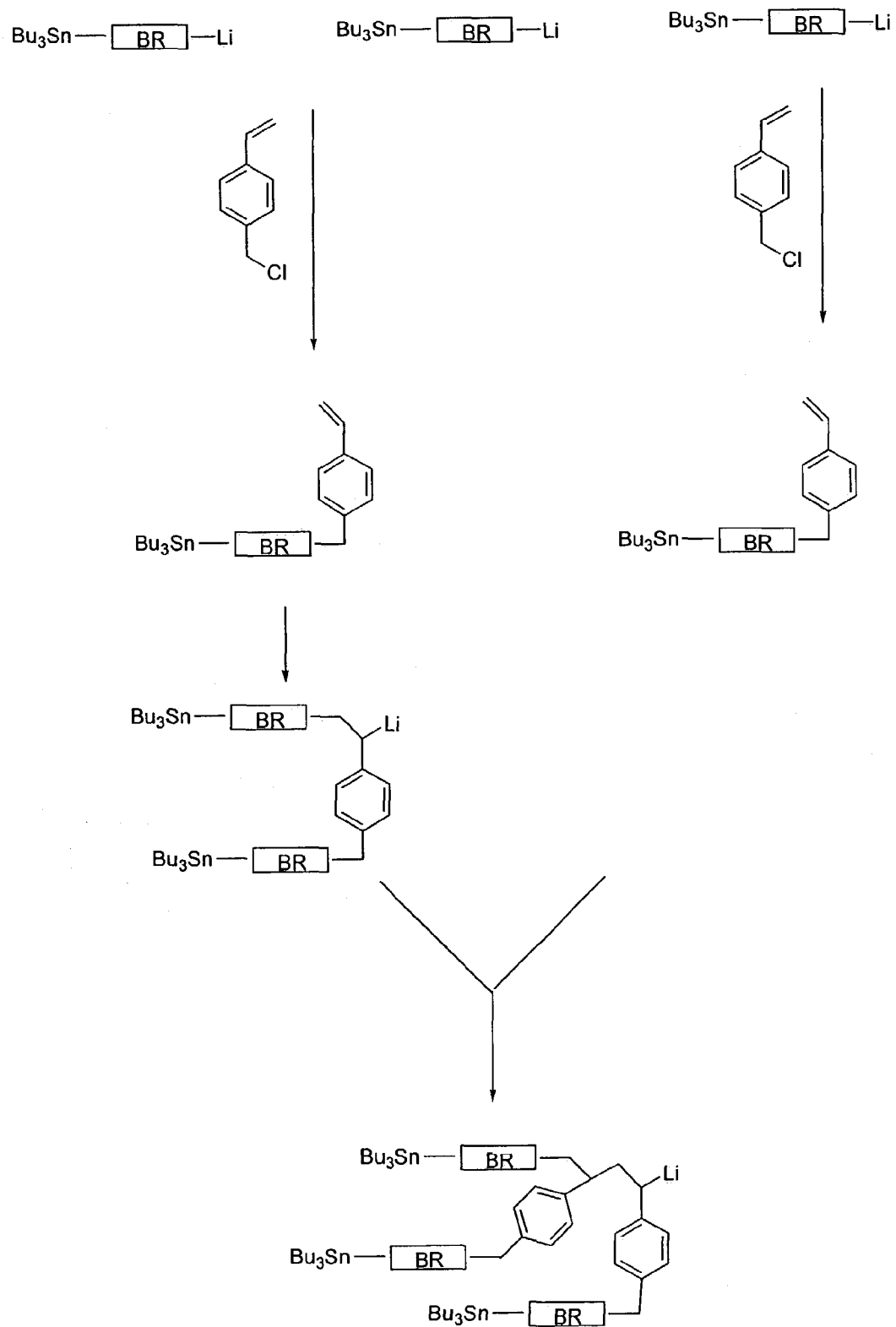
FIG. 1 shows the chemical mechanism by which the formation of the multi-functional initiator is likely to occur.

The multi-functional polymers of this invention include two or more functionalities or functional groups at or near one end of the polymer chain. The functional groups advantageously include those groups that interact with filler or rubber employed in rubber compounds. In view of the discoveries made in this invention, those skilled in the art will be able to synthesize a number of polymer architectures that will provide a rubbery polymer having two or more functionalities at or near one end of a polymer chain.

In one embodiment, the multi-functional polymers include a functionality cluster and at least one polymer chain attached thereto. The multi-functional polymers can be represented by the formula

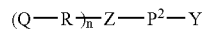

where $(Q\text{—}R)_n$ is a functionality cluster, Q is a functional group, R is a multi-valent organic group, $P^2$ is a long-chain polymer, n is an integer from about 2 to about 10, Y is a proton, a weak functional group, or a selective functional group, and Z is a branch point where the functionality clusters join the long-chain polymer.

Multi-valent organic groups may include hydrocarbylene groups, which may contain hetero atoms. Hydrocarbylene groups include alkylene, substituted alkylene, cycloalkylene, substituted cycloalkylene, alkenylene, substituted alkenylene, cycloalkenylene, substituted cycloalkenylene, arylene, and substituted arylene groups, with each group preferably containing from 1 carbon atom, or the appropriate minimum number of carbon atoms to form the group, up to about 20 carbon atoms. These hydrocarbylene groups may contain heteroatoms such as, but not limited to, nitrogen, oxygen, silicon, sulfur, and phosphorus atoms.

The polymer $P^2$ is preferably a long-chain polymer that include a polymer that is capable of being synthesized by anionic polymerization techniques. Preferably, $P^2$ is longer than 1.5, more preferably longer than 5, even more preferably longer than 20, still more preferably longer than 50, and even more preferably longer than 100 times the entanglement length of the polymer.

The organic group (R) is preferably a hydrocarbylene group and more preferably a divalent polymer. Where the multi-valent organic group includes a polymer chain, the polymeric chain may include any polymer that is capable of being synthesized by anionic polymerization techniques.

Where the organic group (R) is a divalent polymer, the length of the divalent polymer chain is preferably less than 1.5 of the entanglement length, more preferably less than 1.2 of the entanglement length, even more preferably less than 1 entanglement length, still more preferably less than 0.7 of the entanglement length, and even more preferably less than 0.5 of the entanglement length. This will result in a functionality cluster $(Q\text{—}R)_n$ that includes at least two functionalities or functional groups (Q) within three, and preferably two, entanglement lengths. Preferably, the functionality cluster includes at least three, more preferably at least four, and more preferably at least five functional groups within three entanglement lengths. It is also advantageous that the functional groups (Q) within the functionality cluster $(Q\text{—}R)_n$ are spaced apart at a minimum distance from one another. This minimum distance can be defined with reference to the minimum length of each organic group R. Preferably, the length of R is greater than 0.05 of the entanglement length, more preferably greater than 0.1 of the entanglement length, still more preferably greater than 0.2 of the entanglement length, and even more preferably greater than 0.3 of the entanglement length.

The entanglement molecular weight is related to the length of the polymer chain and refers to a number of polymer chain repeating (or mer) units that correspond to a molecular weight sufficiently large for entanglements to occur between molecules of undiluted polymer. This length corresponds to a molecular weight where the slope of a plot of log viscosity vs. log molecular weight changes from 1.0 to 3.4; the change being associated with intermolecular entanglements. In general, the entanglement length has been defined as that length of polymer resulting from about 100 mer units. For purposes of this specification, entanglement length refers to a degree of polymerization that includes a number of mer units on the order of magnitude of about 100 to about 250. Additional experimental techniques for determining the entanglement length of a polymer are summarized by W. W. Graessley in ADV. POLYM. SCI., Vol. 16, 1974, and are known by those skilled in the art.

The functionalities or functional groups within a functionality cluster include those groups or substituents that react or interact with rubber or rubber fillers or otherwise have a desirable impact on filled rubber compositions or vulcanizates. These groups or substituents may be referred to as reactive functionalities. Preferably, the functional groups within the functionality cluster chemically bind the polymer to a filler particle. Useful substituents include trialkyltin substituents and cyclic amine groups. Exemplary trialkyltin substituents are disclosed in U.S. Pat. No. 5,268,439, which is incorporated herein by reference. Exemplary cyclic amino substituents are disclosed in U.S. Pat. Nos. 6,080,835; 5,786,441; 6,025,450; and 6,046,288, which are incorporated herein by reference.

The rubber fillers within the filled rubber compositions that are believed to react or interact with the functional groups preferably include carbon black, starch, silica, alumina, aluminum hydroxide, clay, and magnesium hydroxide.

The end of the polymer chain that is opposite to the functionality cluster (i.e., y) is not functionalized, or it may contain a weak functional group or a functional group that is selectively functional. Weak functional groups include those groups that interact with filler via through-space interaction (e.g., H-bonding, van der Waals interaction, etc.) as well as those groups that interact with or attract to each other and thereby form a domain within the rubber matrix of the polymer. Selective functional groups include those groups whose affinity toward filler particles or rubber can be activated after processing; e.g. during cure. Examples of selective functional groups include those described in co-pending U.S. Ser. No. 10/020,666 now U.S. Pat. No. 6,579,949.

The branch point Z can include a multi-valent atom (e.g., carbon, silicon, phosphorous) or a multi-valent chemical moiety such as a hydrocarbon group. For example, Z can be a short chain hydrocarbon group as shown in FIG. 1.

The multi-functional polymers of this invention can be prepared by a number of methods.

In a first embodiment, the multi-functional polymers are prepared by polymerizing anionically-polymerizable monomers with a multi-functional macroinitiator.

Structurally, the multi-functional macroinitiator is an organometallic macromolecule that includes a functionality cluster, which is defined above.

The multi-functional macroinitiators are preferably prepared by reacting (i) an organic metallic reagent that is capable of adding to a conjugated diene or an activated olefin with (ii) a molar deficiency of a macroinitiator linking agent. Preferably, the organometallic reagent is a short-chain living polymer.

The short-chain living polymers include anionically-polymerized polymers that include at least one living end, i.e., carbanion and a counter cation that preferably includes a lithium or magnesium cation. The short-chain living polymer preferably derives from the polymerization of conjugated diene monomer alone or in combination with vinyl aromatic monomers.

Useful conjugated diene monomers include 1,3-butadiene, isoprene, dimethyl butadiene, and 2-ethyl butadiene. Useful vinyl aromatic monomers include styrene and ring alkyl substituted styrene.

The length of the short chain living polymer should correspond with the minimum and maximum lengths of the substituent R of the multi-functional polymer defined above. For example, the length of the short-chain living polymer should generally be longer than 0.05 of the entanglement length and generally shorter than 1.5 entanglement length. Accordingly, where the short-chain living polymer derives from 1,3-butadiene, the number average molecular weight of the short-chain living polymer is preferably from about 100 g/mol to about 10,000 g/mol, more preferably from about 200 g/mol to about 5,000 g/mol, still more preferably 500 to about 4,000, and even more preferably 1,000 to about 3,000, as determined by using gel permeation chromatography (GPC) calibrated with polystyrene standards and adjusted for the Mark-Houwink constants for the polymer in question.

The short-chain living polymer includes a reactive functionality, which is described above. The reactive functionality preferably results from an initiator that is employed in synthesizing the short-chain living polymer. Useful initiators that will impart a functionality to the short-chain living polymer include trialkyltin lithium compounds, cyclic amino lithium compounds, and cyclic aminoalkyllithium compounds. Examples of tin-lithium compounds include tributyltin lithium, which is disclosed in U.S. Pat. No. 5,268,439, which is incorporated herein by reference. Examples of cyclic amino lithium compounds includes lithio hexamethyleneimine, which is disclosed in U.S. Pat. Nos. 6,080,835; 5,786,441; 6,025,450; and 6,046,288, which are incorporated herein by reference.

The macroinitiator linking agent is a multi-functional compound that includes at least one anionically-polymerizable double bond and at least one group or substituent that is susceptible to nucleophilic attack. The preferred macroinitiator linking agent can be defined by the formula

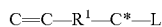
C=C—R$^1$—C*—L where L is a leaving group, C* is a carbon atom susceptible to nucleophilic attack, and R$^1$ is an organic group that will impact the double bond in a manner that will allow the double bond to be anionically polymerized, i.e., it activates the double bond. A leaving group (e.g., L) is an atom or chemical species that is displaced from an electrophile by a nucleophile in a nucleophilic substitution reaction. Preferably the leaving group (L) will react or associate with the living polymer's counter cation (e.g. Li$^+$) and form a stable or neutral compound.

In one preferred embodiment, the macroinitiator linking agent can be defined by the formula

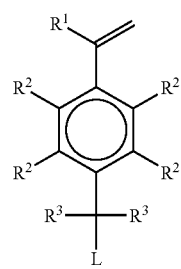

where R$^1$, R$^2$, and R$^3$ are hydrogen or organic groups and L is a halogen atom, a sulfonate, or a phenoxide. Preferably R$^1$, R$^2$, and R$^3$ are hydrogen hydrocarbyl groups, and more preferably alkyl groups having from about 1 to about 6 carbon atoms. The halogen atom is preferably bromine or chlorine. The preferred sulfonates are methyl sulfonate or toluene sulfonate.

Exemplary macroinitiator linking agents include vinylbenzyl chloride, propenyl benzyl chloride, vinyl benzyl bromide, and propenyl dimethyl benzyl chloride.

As noted above, the macroinitiators are formed by reacting the short-chain living polymer with a molar deficiency of the macroinitiator linking agent. This molar deficiency will preferably include from about 0.55 to about 0.99 moles of macroinitiator linking agent per mole of short-chain living polymer, more preferably from about 0.67 to about 0.95 moles of macroinitiator linking agent per mole of short-chain living polymer, and even more preferably from about 0.75 to about 0.93 moles of macroinitiator linking agent per mole of short-chain living polymer.

Without wishing to be bound by any particular theory, the formation of the multi-functional macroinitiator can be better understood with reference to FIG. 1. Shown across the top of the proposed mechanism are three moles of a short-chain living polymer, which are represented by Bu$_3$Sn~Li. The introduction of two moles of vinylbenzyl chloride (VBC) initially reacts with two of the three moles of the short-chain living polymer at the nucleophilic carbon site (e.g., CH$_2$Cl). The unreacted excess of the short-chain living polymer (i.e., one mole) can then react with the VB-Bd-SnBu$_3$ (i.e., reaction product of the vinylbenzyl chloride and the short-chain living polymer) to form a living species. This living species can then react with the remaining one mole of the VB-Bd-SnBu$_3$ to form the multi-functional macroinitiator.

Monomer that may be polymerized with the multi-functional macroinitiator include those monomers that are anionically polymerizable. These monomers include conjugated diene monomers such as those described above with reference to the synthesis of the short-chain living polymer. These conjugated diene monomers may be copolymerized with vinyl aromatic monomer such as styrene.

The reaction conditions that are required to conduct the anionic polymerization with the multi-functional macroinitiator are generally known in the art. For example, it is common to conduct these polymerizations at about 30-80° C. temperature and about 205-555 kPa of pressure.

Preferably, these polymerizations are conducted by using an organic solvent as the polymerization medium. Useful organic solvents include aliphatic, cycloaliphatic, and aromatic hydrocarbons. Examples include n-pentane, n-hexane, n-heptane, n-octane, n-nonane, n-decane, isopentane, isohexane, isoheptane, isooctane, 2,2-dimethyl butane, petroleum ether, kerosene, petroleum spirits, and isomers thereof. Some representative examples of suitable cycloaliphatic solvents include cyclopentane, cyclohexane, methylcyclopentane, methyl cyclohexane, and the like. Some representative examples of suitable aromatic solvents include benzene, toluene, xylene, ethyl benzene, diethyl benzene, mesitylene, and mixtures of aliphatic, cycloaliphatic and aromatic compounds. Commercial mixtures of the above hydrocarbons, such as hexanes, may also be used. For environmental reasons, aliphatic and cycloaliphatic solvents are highly preferred.

In a second embodiment, the multi-functional polymers are prepared by terminating a living polymer with a multi-functional macroterminator.

Structurally, the multi-functional macroterminator includes a leaving group that is attached to a functionality cluster, which is defined above. In one embodiment, the multi-functional macroterminator can be defined by the formula

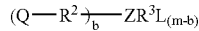

where Z is a branch point as defined above, Q is a functional group as defined above, $R^2$ is an covalent bond or organic group as defined above, L is a leaving group as defined above, $R^3$ is a multi-valent organic group as defined above, m is an integer that is equal to the valency of Z, and b is an integer from 2 to m−1.

In one preferred embodiment, Z is a silicon atom, and multi-functional macroterminator can be defined by the formula

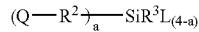

where Q is a functional group, $R^2$ is an covalent bond or organic group, a is an integer of 2 to 3, $R^2$ is a multi-valent or an organic group, and A is a leaving group.

The multi-functional macroterminator may be prepared by reacting a short-chain functionalized living polymer with a macroterminator linking agent.

The short-chain functionalized living polymer employed in the preparation of the macroterminator includes polymers that are similar to the short-chain living polymers employed in the preparation of the macroinitiator, which include a filler-interactive functionality.

The macroterminator linking agent is a multi-functional reagent that preferably includes at least three reactive leaving groups. In one embodiment, the macroterminator linking agent can be defined by the formula $L_bZ(R^4A)_{(m-b)}$, where Z is a branch point, $R^4$ is a covalent bond or a multi-valent organic group, L is a leaving group, A is a leaving group that is less reactive than L, m is equal to the valency of Z, and b is an integer from 2 to m−1. In a preferred embodiment, Z is silicon, and therefore the macroterminator linking agents can be defined by the formula $L_aSi(R^4A)_{(4-a)}$, where Si is a silicon atom, $R^4$ is an organic group, L is a leaving group, A is a leaving group that is less reactive than L, and a is 2 or more. The term less reactive than L refers to the fact that a nucleophile will, on a statistical basis, replace L prior to replacing A.

Exemplary macroterminator linking agents include trichlorosilicon methylene chloride, tribromosilicon methylene chloride, trichlorosilicon methylene bromide, and 3-glycidoxypropyltrimethoxysilane (GPMOS).

In a preferred embodiment, the molar ratio of short-chain living polymer (i.e., lithium atom) to macroterminator linking agent is preferably determined based upon the number of equivalents of L within $L_bZ(R^4A)_{(m-b)}$. In other words, one equivalent of lithium (i.e., living polymer) is reacted with one equivalent of L (i.e., the integer represented by b). The resultant multi-functional macroterminator can be represented by the formula

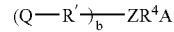

where Q, $R^4$, R', A, and a are defined above.

Anionically-polymerized living polymers are formed by reacting anionic initiators with unsaturated monomers to propagate a polymeric structure. Throughout formation and propagation of the polymer, the polymeric structure is anionic and "living." A living polymer, therefore, is a polymeric segment having a living or reactive end. For example, when a lithium (Li) containing initiator is employed to initiate the formation of a polymer, the reaction produces a reactive polymer having a Li atom at its living end. This living end remains after complete polymerization so that a new batch of monomer subsequently added to the reaction can add to the existing chains and increase the degree of polymerization. For further information respecting anionic polymerizations, one can refer to PRINCIPLES OF POLYMERIZATION, $3^{RD}$ EDITION, by George Odian, John Wiley & Sons, Inc. (1991), Chapter 5, entitled *Ionic Chain Polymerization*, or Panek et al., J. AM. CHEM. SOC., 94, 8768 (1972).

Monomers that can be employed in preparing a living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any anionic initiator can be employed to initiate the formation and propagation of the living polymers. Exemplary initiators include, but are not limited to, alkyl lithium initiators such as n-butyl lithium, arenyllithium initiators, arenylsodium initiators, N-lithium dihydro-carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as substituted aldimines, substituted ketimines, and substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference.

The amount of initiator employed in conducting anionic polymerizations can vary widely based upon the desired polymer characteristics. In one embodiment, it is preferred to employ from about 0.1 to about 100, and more preferably from about 0.33 to about 10 mmol of lithium per 100 g of monomer.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis(2'-tetrahydrofuryl)propane, di-piperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, owned by the Assignee of record, the subject matter of which relating to such modifiers is incorporated herein by reference. Compounds useful as polar coordinators include those having an oxygen or nitrogen hetero-atom and a non-bonded pair of electrons.

Anionic polymerizations are typically conducted in a polar or non-polar solvent such as tetrahydrofuran (THF) or a nonpolar hydrocarbon such as the various cyclic and acyclic hexanes, heptanes, octanes, pentanes, their alkylated derivatives, and mixtures thereof.

In another embodiment, the macroterminating linking agent can be defined by the formula $Z(R^5L)_m$, where Z is a branch point as defined above, $R^5$ is a covalent bond or a multi-valent organic group, L is a leaving group, and m is equal to the valency of Z. In a preferred example, Z is a silicon atom, and therefore the macroterminator linking agent can be defined by the formula $Si(R^5L)_4$. Where $R^5$ is a covalent bond and L is a chlorine atom, the macroterminating linking agent is silicon tetrachloride.

In another embodiment, the multi-functional polymers can be prepared by reacting a polymer containing a leaving group cluster with short-chain functionalized living polymers. The polymer containing a leaving group cluster can be defined by the formula

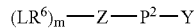

$$(LR^6)_m\!\!-\!\!Z\!\!-\!\!P^2\!\!-\!\!Y$$

where L is a leaving group, $R^6$ is a covalent bond or a multi-valent organic group, Z is a branch point, $P^2$ is long-chain polymer, Y is a proton, a weak functional group, or a selective functional group, and m is an integer that is equal to the valency of Z, all of which are defined above. The short-chain functionalized living polymer that is reacted with this polymer containing a leaving group cluster includes polymers that are similar to the short-chain living polymers employed in the preparation of the macroinitiator, which preferably include a filler-interactive functionality. The reaction preferably takes place by reacting m equivalents of short-chain functionalized living polymer with the polymer containing the leaving group cluster.

The polymer containing the leaving group cluster can be prepared by using several techniques. In one embodiment, a long-chain living polymer is terminated with a terminating agent having the formula $Z(R^5L)_m$ where Z is a branch point, $R^7$ is a covalent bond or a multi-valent organic group, L is a leaving group, and m is an integer equal to the valency of Z.

Where this compound is silicon tetrachloride, the reaction is conducted by reacting about 1 mole of the long-chain living polymer with about 1 mole of silicon tetrachloride at room temperature. Although various side products may result, the resulting polymer containing a leaving group cluster will include a long-chain polymer having a silicon trichloride functionality at its terminal end. An excess of silicon tetrachloride can be used to improve yield of the desired product. This polymer can then be reacted with short chain living polymer to produce the multi-functional polymers of this invention via a nucleaphilic substitution reaction at the three chlorine atoms. Accordingly, it is preferred to react about 3 moles of the short-chain functionalized living polymer with one mole of the polymer containing the leaving group cluster (i.e., 1 mole of short-chain functionalized living polymer per equivalent of chlorine).

In another embodiment, the terminating agent that is reacted with the long-chain living polymer to produce the polymer containing a leaving group cluster can be defined by the formula $L_bZ(R^8L)_{m-b}$ where L is a leaving group, Z is a branch point, $R^8$ is a covalent bond or multi-valent organic group, m is equal to the valency of Z, and b is an integer from 2 to m−1.

Where this terminating agent is 3-glycidoxypropyltrimethoxysilane (GPMOS), it is believed that the living long-chain polymer will react with the GPMOS at the epoxide site (i.e., the oxygen acting as the leaving group and the living polymer covalently bonding with the highly electrophilic carbon atom of the epoxide ring). Other useful products, however, may result through reaction of the living polymer with the silicon atom by displacing a methoxy group from the silicon atom. The leaving group cluster will be formed by the three methoxy groups of GPMOS, or two of the methoxy groups and the oxygen of the epoxide group. These methoxy groups will act as leaving groups when reacted with short-chain functionalized living polymers to form the multi-functional polymers of this invention.

The reaction between the long-chain living polymer and GPMOS preferably occurs at about 50° C. at a molar ratio of about 1 GPMOS to about 1 living polymer. The reaction between the resulting polymer containing a leaving group cluster and the short-chain living polymer is preferably conducted at a molar ratio of about 1 polymer containing the leaving group cluster to about 3 short-chain functionalized living polymers, although a molar excess of the GPMOS can be used to improve yield of the desired product.

In another embodiment, the multi-functional polymers are prepared by polymerizing hetero-blocks at the head or tail of a rubbery polymer. The hetero-block is prepared by polymerizing short chains of functional macromonomers. For purposes of this specification, the head of the polymer will refer to that point of the polymer main chain where the initiator adds to the first monomer. The tail will therefore refer to that point of a polymer main chain where the last monomer is added to the chain, i.e., the polymer is terminated.

Where the functional macromonomers are polymerized into a hetero-block at the head of a polymer chain, the polymerization of the functional macromonomers can be initiated with any anionic polymerization initiator. These initiators can include conventional organometallic compounds such as butyl lithium, or functionalized initiators such as tributyltin lithium or lithium hexamethyleneimine. The functional macromonomer is charged first, allowing the polymerization initiator to form a short functional block (i.e., hetero block). The other monomers to be polymerized, e.g., 1,3-butadiene and styrene, are then charged to the same system, and the polymerization is continued in a conventional manner. The resulting living polymer can then be terminated with a proton or a functionalized terminator that will impart a weak or selective functional group to the tail of the polymer.

Where the functional macromonomers are added to the tail of a rubbery polymer, the polymerization of monomer (e.g., 1,3-butadiene and styrene) is initiated with an anionic polymerization initiator. This initiator will preferably not impart a functional group to the head of the polymer, e.g., butyl lithium, or only provide a weak or selective functional group to the head. With these initiators, a living rubbery polymer is prepared by employing conventional techniques. Once the living polymer is prepared to a desired molecular weight, functional macromonomers are added to the same system and polymerization is continued to form a hetero block at the polymer tail. The number of polymeric units that derive from the functional macromonomers can be controlled by regulating the amount of functional macromonomer added to the system or by adding a polymerization terminator, e.g., alcohol. The polymerization terminator can also be a reagent capable of imparting a functional group to the tail of the polymer, e.g., tributyltin chloride.

The functional macromonomer is a macromolecule that includes a double bond capable of being anionically polymerized, e.g., a conjugated double bond, a functional group, and an organic group between the double bond and the functional group where the distance between the double bond and the functional group is less than one entanglement length.

An exemplary multifunctional macromonomer can be prepared by reacting a short chain living polymer that contains a functional group at its head with a compound that is similar to the macroinitiator linking agent defined above, e.g., vinylbenzyl chloride. The reaction product of the short chain living polymer and vinylbenzyl chloride will yield a functional macromonomer that can be defined by the following structure:

where Q is a functional group and R is a organic group. Preferably, R is a short-chain polymer that has a length that is less than one entanglement length.

Other examples include derivatives of conjugated diene monomers. One example of a derivative of a conjugated diene monomer is

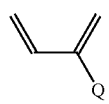

where Q is a functional group.

After formation of the multi-functional polymer, a processing aid and other optional additives such as oil can be added to the polymer cement. The multi-functional polymer and other optional ingredients are then isolated from the solvent and preferably dried. Conventional procedures for desolventization and drying may be employed. In one embodiment, the multi-functional polymer may be isolated from the solvent by steam distillation of the solvent followed by filtration. Residual solvent may be removed by using conventional drying techniques such as a drum dryer. Alternatively, the cement may be directly drum dried.

The multi-functional polymers of this invention are particularly useful in preparing tire components. These tire components can be prepared by using the multi-functional polymers of this invention alone or together with other rubbery polymers. The preparation of vulcanizable compositions and the construction and curing of the tire is not affected by the practice of this invention.

In preparing the vulcanizable compositions of matter, at least one filler may be combined and mixed or compounded with a rubber component, which includes the multi-functional polymer of this invention as well as other optional rubber polymers. Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed. For example, sulfur or peroxide-based curing systems may be employed. Also, see Kirk-Othmer, ENCYCLOPEDIA OF CHEMICAL TECHNOLOGY, $3^{rd}$ Edition, Wiley Interscience, N.Y. 1982, Vol. 20, pp. 365-468, particularly VULCANIZATION AGENTS AND AUXILIARY MATERIALS pp. 390-402, or *Vulcanization* by A. Y. Coran, ENCYCLOPEDIA OF POLYMER SCIENCE AND ENGINEERING, $2^{nd}$ Edition, John Wiley & Sons, Inc., 1989, which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

Preferably, the vulcanizable rubber composition is prepared by forming an initial masterbatch that includes the rubber component and filler. This initial masterbatch is mixed at a starting temperature of from about 25° C. to about 100° C. with a discharge temperature of about 135° C. to about 180° C. To prevent premature vulcanization (also known as scorch), this initial masterbatch generally excludes any vulcanizing agents. Once the initial masterbatch is processed, the vulcanizing agents are introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in the in *The Compounding and Vulcanization of Rubber*, by Stevens in RUBBER TECHNOLOGY SECOND EDITION (1973 Van Nostrand Reinhold Company). The mixing conditions and procedures applicable to silica-filled tire formulations are also well known as described in U.S. Pat. Nos. 5,227,425; 5,719,207; 5,717,022, as well as EP 0890606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 170° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Tire components of this invention preferably include tire treads. The rubber compositions, however, can also be used to form other elastomeric tire components such as subtreads, sidewalls, body ply skims, bead fillers and the like. Pneumatic tires can be made as discussed in U.S. Pat. Nos. 5,866,171; 5,876,527; 5,931,211; and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example I

Preparation of Macroinitiator

To each of four oven-dried $N_2$ purged 800 ml bottles fitted with crimped cap and a rubber liners, were charged a mixture of hexanes (48 g) and butadiene blend (21.4% in hexanes, 102 g) to a concentration of approximately 14% total solids. A polar modifier (0.11 mmol) was added followed by tributyl tin lithium ($Bu_3SnLi$) (10.9 mmol). After one hour of agitation in a 50° C. heating bath, the solution was treated with 4-vinylbenzyl chloride (7.28 mmol). This solution was agitated by hand at room temperature for 2-5 minutes and used within 10 minutes.

Example II

Preparation of Polymer from Macroinitiator (Samples 1-3)

A 19 L reactor was charged with hexanes (2.3 kg), styrene blend (34% in hexanes, 1.6 kg), butadiene blend (21.9% in hexanes, 7.4 kg), polar modifier (1.44 mmol) and all 4 bottles of macroinitiator from Example I (14.4 mmol of Li). The reactor was heated in batch mode at 50° C., exotherming from 70°-75° C. After two hour, the polymer was dropped into isopropyl alcohol and antioxidant, isolated and drum-dried. This polymer is represented as Sample 1 in Table I. Samples 2 and 3, which are also set forth in Table I, were prepared by using the same procedures as set forth for preparing Sample 1.

The characteristics of the multi-functional polymers that were prepared are set forth in Table I.

Example III

Preparation of Macroinitiator

To an oven-dried $N_2$ purged 800 ml bottle fitted with crimped cap and a rubber liner, was charged a mixture of hexanes (175 g) and butadiene blend (21.8% in hexanes, 148 g) to a concentration of approximately 10% total solids. A polar modifier (0.16 mmol) was added followed by isoprene extended hexamethyleneimine (HMI) propyllithium initiator (16.1 mmol). After one hour of agitation in a 50° C. heating bath, the solution was treated with 4-vinylbenzyl chloride (11.9 mmol). This solution was agitated by hand at room temperature for 2-5 minutes and used within 10 minutes.

Example IV

Preparation of Polymer from Macroinitiator (Sample 4)

An 8 L reactor was charged with hexanes (2.3 kg), styrene blend (34% in hexanes, 1.2 kg), butadiene blend (21.8% in hexanes, 5.6 kg), polar modifier (0.4 mmol) and all of the macroinitiator in Example IV (3.9 mmol of Li). The reactor was heated in batch mode at 50° C., exotherming from 55°-60° C. After two hours, the polymer was dropped into isopropyl alcohol and antioxidant, isolated and drum-dried.

The characteristics of the multi-functional polymers that were prepared are set forth in Table I.

Example V

Preparation of Unfunctionalized Macroinitiator

In a similar fashion to Example I, three macroinitiators were prepared except that n-butyl lithium (BuLi) was employed to initiate polymerization of the short polymer chains in lieu of tributyl tin lithium ($Bu_3SnLi$). As a result, the resulting architecture of the macroinitiators were the same as those prepared in Example I, except that the various branches were not functionalized.

Example VI

Preparation of Polymer from Unfunctionalized Macroinitiator (Samples 5-7)

In a similar fashion to Example II, three polymers were prepared using the unfunctionalized initiators prepared in Example V. The resulting architecture of the polymer was the same as those prepared in Example II except that the head of the polymer, which was branched, was not functionalized. The three polymers, which are identified as Samples 5-7, where characterized as set forth in Table I.

TABLE I

| Sample No. | Functional Group | Number of Functional Groups | $M_n$ | $M_w$ | $M_n/M_w$ | Mooney $ML_{1+4}$ @ 100° C. | Styrene (% wt) | $T_g$ (° C.) | Sn (ppm) |
|---|---|---|---|---|---|---|---|---|---|
| 1 | alkyl-tin | 2–3 | 153,000 | 221,000 | 1.45 | 50.5 | 23.5 | −47.9 | 1,419 |
| 2 | alkyl-tin | 2–3 | 187,000 | 246,000 | 1.31 | 78.7 | 24.0 | −42.6 | 1,384 |
| 3 | alkyl-tin | 2–3 | 132,000 | 203,000 | 1.54 | 51.5 | 22.3 | −44.7 | 1,099 |
| 4 | HMI | 2–3 | 134,000 | 226,000 | 1.68 | 63.8 | 25 | −51 | — |
| 5 | None | — | 159,760 | 194,584 | 1.22 | 46 | 20.3 | −49 | — |
| 6 | None | — | 176,384 | 345,756 | 1.39 | 82.5 | 20.3 | 47.2 | — |
| 7 | None | — | 210,048 | 309,706 | 1.47 | 103.5 | 22.1 | 44.2 | — |

Example VII

Preparation of Vulcanizate (Compounds 1-X, 1-1 Through 1-7)

The rubbery polymers prepared above were mixed into a tire compound and analyzed for various properties before and after curing. The tire compound recipe that was employed is set forth in Table II.

TABLE II

| Ingredient | Parts by Weight |
|---|---|
| Rubbery Polymer | 70 |
| Natural Rubber | 30 |
| Carbon Black | 41 |
| Wax | 1.0 |
| Antidegradant | 0.95 |
| Zinc Oxide | 2.5 |
| Stearic Acid | 2.0 |
| Naphthenic Oil | 5.25 |
| Aromatic Oil | 5.25 |
| Sulfur | 1.3 |

TABLE II-continued

| Ingredient | Parts by Weight |
|---|---|
| Accelerator | 1.7 |
| Accelerator | 0.2 |

The characteristics of the compound and vulcanizates are set forth in Table III.

The rubber employed in Compound 1-X was functionalized poly(styrene-co-butadiene) that had a styrene content of about 35%, a Tg of about −40° C., and a Mooney Viscosity ($ML_{1+4}$@100° C.) of about 70. This poly(styrene-co-butadiene) control was initiated with tributyl tin lithium and terminated with equal parts of tin tetrachloride and tributyl tin chloride.

After mixing, the compounds were analyzed for carbon black dispersion and Mooney Viscosity ($ML_{1+4}$@130° C.). Carbon black dispersion (Surfanalyzer Dispersion Index) was measured according to ASTM D 2663, Test Method C (1995), except that the same calibration values, A and B, were used for all test samples with periodic review of the calculated dispersion ratings relative to dispersion estimates from light optical microscopy.

TABLE III

| Compound | 1-X | 1-1 | 1-2 | 1-3 | 1-4 | 1-5 | 1-6 | 1-7 |
|---|---|---|---|---|---|---|---|---|
| Poly(styrene-co-butadiene) | Control | Sample 1 | Sample 2 | Sample 3 | Sample 49 | Sample 5 | Sample 6 | Sample 7 |
| Surfanalyzer (average of 2) | 68.2 | 77.8 | 79.7 | 85.9 | 66.3 | 95.8 | 88.2 | 81.2 |
| Compound Mooney $ML_{1+4}$ @ 130° C. | 56.7 | 41.2 | 41.7 | 35.6 | 52.6 | 33.1 | 42.9 | 47.4 |
| Ring Tensile @ 23° C. | | | | | | | | |
| 300% Modulus (MPa) | 9.36 | 8.4 | 8.93 | 8.54 | 9.34 | 7.89 | 8.49 | 8.18 |
| Tensile @ Break (MPa) | 18.24 | 19.46 | 19.68 | 19.97 | 21.06 | 18.31 | 20.99 | 18.06 |
| Elongation @ Break (%) | 442 | 490 | 481 | 493 | 490 | 509 | 530 | 488 |
| Ring Tensile @ 100° C. | | | | | | | | |
| 300% Modulus (MPa) | 7.57 | 6.61 | 6.69 | 6.65 | | 6.27 | 6.71 | 6.61 |
| Tensile @ Break (MPa) | 8.20 | 8.34 | 7.69 | 8.78 | 7.72 | 8.44 | 10.02 | 9.53 |
| Elongation @ Break (%) | 315 | 346 | 327 | 353 | 490 | 364 | 391 | 378 |
| Ring Tear @ 23° C. (kN/m) | 60.2 | 68.2 | 67.2 | 69.0 | 63.2 | 68.6 | 72.4 | 70.2 |
| Ring Tear @ 117° C. (kN/m) | 22.4 | 29.4 | 30.2 | 27.2 | 27.2 | 28.4 | 43.2 | 29.6 |
| Dynastat (1 Hz at 2% strain) | | | | | | | | |
| M' @ 50° C. (MPa) | 5.272 | 5.205 | 4.851 | 4.748 | 6.171 | 5.39 | 5.37 | 5.45 |
| tan δ @ 50° C. | 0.092 | 0.093 | 0.102 | 0.095 | 0.100 | 0.138 | 0.133 | 0.119 |
| Strain Sweep (1 Hz) @ 23° C. | | | | | | | | |
| tan δ @ 5% strain | 0.110 | 0.116 | 0.120 | 0.115 | 0.119 | 0.167 | 0.173 | 0.144 |
| ΔG' [0.25-14%] (MPa) | 0.564 | 0.543 | 0.654 | 0.501 | 0.565 | 1.59 | 1.35 | 1.36 |
| Torsion Rectangular | | | | | | | | |
| tan δ @ 50° C. | 0.087 | 0.099 | 0.096 | 0.092 | 0.095 | 0.158 | 0.149 | 0.117 |

The data of Table III was employed to graph the tan δ of the various samples as a function of percent bound rubber at room temperature. This graph is represented in FIG. 2. This graph also includes another control, which is represented as compound 1-Y. This compound was prepared by employing a poly(styrene-co-butadiene) that was prepared and terminated in a similar fashion to the polymer used in Compound 1-X except that the polymer was initiated with n-butyl-lithium (i.e., no head functionalization; only one functional group at the tail).

Test specimens of each rubber formulation were prepared by cutting out the required mass from an uncured sheet (about 2.5 mm to 3.81 mm thick). Test specimens were cured within closed cavity molds under pressure for 13 minutes at 165° C. Modulus at 300%, elongation at break, and tensile strength were measured according to ASTM D 412 (1998) Method B, where samples were died from a cured sheet about 1.8 mm thick. Rubber cylinders measuring about 9.5 mm in diameter and 16 mm high were analyzed by using a Dynastat viscoelastic analyzer and an RDA (Reometrics Dynamic Analyzer). Dynastat M', RDA G', and Dynastat tan δ are reported in Table III.

Example VIII

Preparation of Macroterminator

To each of 3 oven-dried $N_2$ purged 800 mL bottles fitted with crimped cap and rubber liners, were charged a mixture of hexanes (36 g) and butadiene blend (22.5%, 14.4 g) to a concentration of 16% total solids. A polar modifier (0.26 mmol) was added followed by tributyl tin lithium ($Bu_3SnLi$) (0.8 mmol). After one hour of agitation in a 50° C. heating bath, the bottles were agitated in a room temperature heating bath for 20 minutes. A solution of $SiCl_4$ was added (0.24 mmol) and the bottles agitated at room temperature for 30 minutes. These solutions were then used as macroterminators for higher molecular weight polymers.

Example IX

Termination of Living Polymer with Macroterminator (Samples 8 & 9)

A 19 L reactor was charged with hexanes (14.5 lbs.), styrene blend (34% in hexanes, 1.7 lbs.), butadiene blend (22.5% in hexanes, 8.6 lbs.), polar modifier (2.0 mmol) and BuLi (8.1 mmol). The reactor was heated to an exotherm temperature of 70-75° C. After 1.5 hours of reaction time, the polymer-lithium cement (Li:Si—Cl ratio=1:1) was dropped into bottles containing the macroterminator solutions prepared in Example VIII. These bottles were agitated at 50° C. for one hour, isolated and drum-dried.

Example X

Preparation of Polymer Containing Leaving Group Cluster

A 19 L reactor was charged with hexanes (11.4 lbs.), styrene blend (34% in hexanes, 2.7 lbs.), butadiene blend (22.5% in hexanes, 15.7 lbs.), polar modifier (6.1 mmol) and BuLi (18.6 mmol). The reactor was heated to an exotherm temperature of 65-70° C. After 1.5 hours of reaction time, the polymer-lithium cement was dropped into oven-dried $N_2$ purged 800 mL bottles fitted with crimped cap and rubber liners. Each bottle was treated with 1 equivalent per lithium of 3-glycidoxypropyltrimethooxysilane (GPMOS). The terminated polymer was then reacted further in Example XI.

Example XI

Reaction of Leaving Group Cluster with Short-Chain Polymer (Sample 10)

A 19 L reactor was charged with hexanes (15.4 lbs.) and butadiene blend (21% in hexanes, 15.4 lbs.), polar modifier (25 mmol) and tributyl tin lithium (76 mmol). The reactor was heated to an exotherm temperature of 55-60° C. After 1.5 hours of reaction time, the polymer-lithium cement (3 equivalents per Li) was dropped into bottles containing the terminated polymer from Example X (1 equivalent per lithium). The bottles were agitated at 50° C. for 1 hour, isolated and drum-dried.

Example XII

Preparation of Vulcanizate (Compounds 1-Y, 1-Z, and 1-8 through 1-10)

The rubbery polymers prepared above were mixed into a tire compound using conventional techniques and analyzed for various properties before and after curing. The tire compound recipe that was employed is set forth in Table IV.

TABLE IV

| Ingredient | Parts by Weight |
|---|---|
| Rubbery Polymer | 100 |
| Carbon Black | 55 |
| Wax | 1.0 |
| Antidegradant | 0.95 |
| Zinc Oxide | 2.5 |
| Stearic Acid | 2.0 |
| Oil | 10 |
| Sulfur | 1.3 |
| Accelerator | 1.7 |
| Accelerator | 0.2 |

The characteristics of the compound and vulcanizates are set forth in Table V. The length of the polymer chain within the functionality cluster of the multi-functional polymers is set forth as the arm length.

The rubber employed in Compound 1-Y was functionalized poly(styrene-co-butadiene) that had a styrene content of about 35%, a Tg of about −40° C., and a Mooney Viscosity ($ML_{1+4}$@100° C.) of about 70. This poly(styrene-co-butadiene) control was initiated with tributyl tin lithium and terminated with equal parts of tin tetrachloride and tributyl tin chloride.

The polymer used in compound 1-Z was prepared by using n-butyl lithium as an initiator and isopropyl alcohol as a quenching agent. This polymer likewise had a styrene content of about 20% and a butadiene content of about 80%.

After mixing, the compounds were analyzed for carbon black dispersion and Mooney Viscosity ($ML_{1+4}$@130° C.). Carbon black dispersion (Surfanalyzer Dispersion Index) was measured according to ASTM D 2663, Test Method C (1995), except that the same calibration values, A and B, were used for all test samples with periodic review of the calculated dispersion ratings relative to dispersion estimates from light optical microscopy.

TABLE V

| Compound | 1-Y | 1-Z | 1-8 | 1-9 | 1-10 |
| --- | --- | --- | --- | --- | --- |
| Poly(styrene-co-butadiene) | Control 1 | Control 2 | Sample 8 | Sample 9 | Sample 10 |
| Arm Length (kg/mol) | n/a | n/a | 1 | 23 | 15 |
| Tg (° C.) | −40.0 | −33.2 | −40.1 | −41.3 | −36.0 |
| Mn (kg/mol) | 178 | 114 | 73 | 169 | 154 |
| Mw/Mn | 1.57 | 1.06 | 2.07 | 1.53 | 4.25 |
| Compound Mooney $ML_{1+4}$ @ 130° C. | 98.1 | 25.9 | 67.6 | 66.9 | 59.8 |
| Ring Tensile @ 23° C. | | | | | |
| 300% Modulus (MPa) | 14.0 | 11.2 | 14.4 | 13.6 | 13.8 |
| Tensile @ Break (MPa) | 22.5 | 16.0 | 21.0 | 17.0 | 17.7 |
| Dynastat (1 Hz at 5% strain) | | | | | |
| tan δ @ 50° C. | 0.119 | 0.254 | 0.106 | 0.146 | 0.165 |
| Strain Sweep (1 Hz) @ 50° C. | | | | | |
| tan δ @ 5% strain | 0.118 | 0.257 | 0.105 | 0.143 | 0.165 |
| ΔG' [0.25–14%] (MPa) | 1.07 | 4.69 | 0.73 | 1.09 | 1.66 |
| Bound Rubber (%) | 50.4 | 13.8 | 47.8 | 42.4 | 30.2 |

Various modifications and alterations that do not depart from the scope and spirit of this invention will become apparent to those skilled in the art. This invention is not to be duly limited to the illustrative embodiments set forth herein.

What is claimed is:

1. A process for preparing a multi-functional polymer comprising the steps of:
    preparing a multi-functional macroinitiator by reacting short-chain living polymer with a molar deficiency of a macroinitiator linking agent defined by the formula

C=C—R¹—C*—X where X is a leaving group, C* is a carbon atom susceptible to nucleophilic attack, and $R^1$ is an organic group that will impact the double bond in a manner that will allow the double bond to be anionically polymerized, where the short-chain living polymer is characterized by a length that is longer than 0.05 of the entanglement length and shorter than 1.5 of the entanglement length, where the said short-chain living polymer includes a functional group in addition to a living end, and where the functional group derives from synthesizing the short-chain living polymer with an initiator selected from the group consisting of trialkyltin lithium compounds, cyclic amino lithium compounds, and cyclic amino alkyllithium compounds; and
    polymerizing monomer with the multi-functional macroinitiator.

2. The process of claim 1, where the molar deficiency includes from about 0.55 to about 0.95 moles of macroinitiator linking agent per mole of short-chain living polymer.

3. The process of claim 1, where the macroinitiator linking agent is vinylbenzyl chloride.

4. The process of claim 1, where the monomer is conjugated diene monomer.

5. The process of claim 4, where the monomer further includes styrene.

6. The process of claim 1, where the short-chain living polymer is characterized by a length that is less than 1 of the entanglement length.

7. The process of claim 1, where the short-chain living polymer is characterized by a length that is less than 0.7 of the entanglement length.

8. The process of claim 1, where the short-chain living polymer is characterized by a length that is less than 0.5 of the entanglement length.

9. The process of claim 1, where the short-chain living polymer includes living polybutadiene.

10. The process of claim 9, where the living polybutadiene has a number molecular weight of from about 100 to about 10,000 g/mol as determined by GPC.

11. The process of claim 10, where the living polybutadiene has a number molecular weight of from about 200 to about 5,000 g/mol as determined by GPC.

12. The process of claim 11, where the living polybutadiene has a number molecular weight of from 500 to about 4,000 g/mol as determined by GPC.

13. The process of claim 12, where the living polybutadiene has a number molecular weight of from 1,000 to about 3,000 g/mol as determined by GPC.

14. The process of claim 1, where the macroinitiator linking agent is defined by the formula

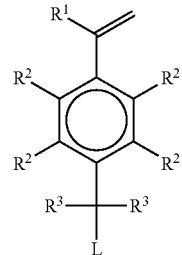

where $R^1$, $R^2$, and $R^3$, are hydrogen or organic groups, and L is a halogen atom, a sulfonate, or a phenoxide.

15. The process of claim 14, where $R^1$, $R^2$, and $R^3$ are hydrogen or hydrocarbyl groups.

16. The process of claim 1, where the macroinitiator linking agent is vinylbenzyl chloride, propenyl benzyl chloride, vinyl benzyl bromide, or propenyl dimethyl benzyl chloride.

17. The process of claim 2, where the molar deficiency includes from about 0.67 to about 0.95 moles of macroinitiator linking agent per mole of short-chain living polymer.

18. The process of claim 17, where the molar deficiency includes from about 0.75 to about 0.93 moles of macroinitiator linking agent per mole of short-chain living polymer.

19. The process of claim 1, where said step of polymerizing monomer with the multi-functional macroinitiator occurs within an organic solvent.

20. The process of claim 19, where the organic solvent is an aliphatic solvent.

* * * * *